(12) United States Patent
Ouziel

(10) Patent No.: US 10,688,705 B2
(45) Date of Patent: Jun. 23, 2020

(54) SYSTEM AND METHOD FOR MAKING A CAPPED VARIEGATED STRUCTURE

(71) Applicant: CPG International LLC, Skokie, IL (US)

(72) Inventor: S. Adam Ouziel, Blue Ash, OH (US)

(73) Assignee: CPG International LLC, Skokie, IL (US)

(*) Notice: Subject to any disclaimer, the term of this patent is extended or adjusted under 35 U.S.C. 154(b) by 405 days.

(21) Appl. No.: 15/593,624

(22) Filed: May 12, 2017

(65) Prior Publication Data

US 2018/0326639 A1    Nov. 15, 2018

(51) Int. Cl.
*B29C 48/07* (2019.01)
*B29C 59/00* (2006.01)
(Continued)

(52) U.S. Cl.
CPC ............ *B29C 48/07* (2019.02); *B29C 48/002* (2019.02); *B29C 48/0014* (2019.02); *B29C 48/154* (2019.02); *B29C 48/155* (2019.02); *B29C 48/175* (2019.02); *B29C 48/21* (2019.02); *B29C 48/30* (2019.02); *B29C 48/304* (2019.02); *B29C 48/307* (2019.02); *B29C 48/34* (2019.02); *B29C 48/49* (2019.02); *B29C 59/005* (2013.01); *B29C 59/026* (2013.01); *B32B 27/08* (2013.01);
(Continued)

(58) Field of Classification Search
CPC ..... B29C 48/07; B29C 48/34; B29C 48/0014; B29C 48/49; B29C 48/307; B29C 48/175; B29C 48/155; B29C 48/304; B29C 48/30; B29C 48/21; B29C 48/002; B29C 48/154; B29C 59/026; B29C 59/005; B29C 48/022; E04F 15/105; B32B 37/153; B32B 33/00; B32B 27/20; B32B 27/08; B32B 27/32; B32B 27/304; B29L 2007/002; B29L 2009/005; B29L 2031/10; B29K 2027/06; B29K 2023/065; B29B 11/10

See application file for complete search history.

(56) References Cited

U.S. PATENT DOCUMENTS 3,444,031 A * 5/1969 Schrenk ................. G03B 21/62
                                                            428/114
6,752,941 B2    6/2004 Hills
(Continued)

FOREIGN PATENT DOCUMENTS

DE    202006007797 U1    9/2006
GB          1236585        6/1971
JP       S49118767 A     11/1974

OTHER PUBLICATIONS

European Search Report for EP1817144 dated Sep. 27, 2018.

*Primary Examiner* — Michael N Orlando
*Assistant Examiner* — Cynthia L Schaller
(74) *Attorney, Agent, or Firm* — Buchanan Ingersoll & Rooney PC

(57) ABSTRACT

In a system and method for making a capped structure having a variegated cap layer a layer of cap materials is applied to a substrate and pin stripes are applied onto the cap layer through an extrusion die. After these materials exit the extrusion die they are passed through a single opening in a die plate to create a capped structure having a variegated appearance. This capped structure has a smooth surface that enables an embosser to create a consistent embossing pattern on the entire surface.

20 Claims, 2 Drawing Sheets

(51) Int. Cl.
<table>
<tr><td>B29C 59/02</td><td>(2006.01)</td></tr>
<tr><td>B29C 48/00</td><td>(2019.01)</td></tr>
<tr><td>B29C 48/21</td><td>(2019.01)</td></tr>
<tr><td>B29C 48/30</td><td>(2019.01)</td></tr>
<tr><td>B29C 48/154</td><td>(2019.01)</td></tr>
<tr><td>B32B 33/00</td><td>(2006.01)</td></tr>
<tr><td>B32B 27/08</td><td>(2006.01)</td></tr>
<tr><td>B32B 27/20</td><td>(2006.01)</td></tr>
<tr><td>E04F 15/10</td><td>(2006.01)</td></tr>
<tr><td>B29C 48/155</td><td>(2019.01)</td></tr>
<tr><td>B32B 37/15</td><td>(2006.01)</td></tr>
<tr><td>B29C 48/17</td><td>(2019.01)</td></tr>
<tr><td>B29C 48/49</td><td>(2019.01)</td></tr>
<tr><td>B29C 48/305</td><td>(2019.01)</td></tr>
<tr><td>B29C 48/34</td><td>(2019.01)</td></tr>
<tr><td>B29B 11/10</td><td>(2006.01)</td></tr>
<tr><td>B29K 23/00</td><td>(2006.01)</td></tr>
<tr><td>B29K 27/06</td><td>(2006.01)</td></tr>
<tr><td>B29L 31/10</td><td>(2006.01)</td></tr>
<tr><td>B32B 27/32</td><td>(2006.01)</td></tr>
<tr><td>B32B 27/30</td><td>(2006.01)</td></tr>
<tr><td>B29L 7/00</td><td>(2006.01)</td></tr>
<tr><td>B29L 9/00</td><td>(2006.01)</td></tr>
</table>

(52) U.S. Cl.
CPC .............. *B32B 27/20* (2013.01); *B32B 33/00* (2013.01); *B32B 37/153* (2013.01); *E04F 15/105* (2013.01); *B29B 11/10* (2013.01); *B29C 48/022* (2019.02); *B29K 2023/065* (2013.01); *B29K 2027/06* (2013.01); *B29L 2007/002* (2013.01); *B29L 2009/005* (2013.01); *B29L 2031/10* (2013.01); *B32B 27/304* (2013.01); *B32B 27/32* (2013.01)

(56) References Cited

U.S. PATENT DOCUMENTS

| | | | |
|---|---|---|---|
| 7,507,464 | B2 | 3/2009 | Walrath |
| 7,987,885 | B2 | 8/2011 | Zhou et al. |
| 8,827,676 | B1* | 9/2014 | Bigbee, Jr. ............ B29C 48/865 425/113 |
| 8,955,281 | B2 | 2/2015 | Pietruczynik et al. |
| 9,222,269 | B2 | 12/2015 | Bruins |
| 9,452,560 | B2 | 9/2016 | Kalkanoglu et al. |
| 2003/0021915 | A1 | 1/2003 | Rohatgi et al. |
| 2007/0092701 | A1 | 4/2007 | Jeng |
| 2007/0141316 | A1 | 6/2007 | McGrath et al. |
| 2007/0154689 | A1 | 7/2007 | Hughes et al. |
| 2008/0010924 | A1 | 1/2008 | Pietruczynik et al. |
| 2009/0081448 | A1 | 3/2009 | Jambois et al. |
| 2009/0155568 | A1 | 6/2009 | Erwin |
| 2010/0159213 | A1* | 6/2010 | Przybylinski ........... B32B 27/04 428/195.1 |

* cited by examiner

SYSTEM AND METHOD FOR MAKING A CAPPED VARIEGATED STRUCTURE

FIELD OF INVENTION

The present invention relates to manufacture of a structures having a substrate and one or more cap layers on the substrate and having a pattern of streaks that are visible through the surface of the cap layer or layers. This structure can be used for building materials such as, polymeric siding, synthetic roofing shingles, slates, shakes and panels, decking, floor coverings, tiles, fence posts, fence rails and window frames.

BACKGROUND OF THE INVENTION

Decking boards, siding and a number of other products are made by extruding a substrate and then applying a cap layer or layers on at least one surface, usually the top surface of the substrate. Optically clear polymers have been used for making a transparent cap layer. It is known that streaks can be created in the cap layer or cap layers by inserting color pellets into the cap layer material. During the extrusion process the color pellets melt creating streaks in the cap layer and providing a variegated appearance.

U.S. Pat. No. 4,048,101 to Nakamachi discloses the manufacture of opaque articles having a variegated pattern of streaks. The variegated pattern is produced by extruding a foamed polymeric matrix material together with polymeric accent materials having colorant additives, which form accent color streaks in the polymeric matrix material. The polymeric accent materials have a lower melt index and a larger particle size compared to the foamed matrix material, such that its melt flow rate is lower than that of the matrix material. The accent material and the matrix material are resinous compositions of the same chemical type, to assure bonding therebetween.

U.S. Pat. No. 5,387,381 to Saloom discloses a method for making an opaque cap layer having a simulated wood-grain appearance for coextrusion with a polyvinylchloride (PVC) substrate. The cap stock material combines a polymeric matrix with accent color pellets consisting essentially of acrylics or polycarbonates having a higher deflection temperature and a larger particle size compared to the polymeric matrix. During an extrusion cycle, the polymeric matrix undergoes melt flow, and the accent color pellets undergo melt flow later in the extrusion cycle, which produces accent color streaks in the extruded cap stock matrix.

U.S. Pat. No. 5,866,054 to Dorchester discloses an opaque cap stock manufactured with a PVC polymer matrix together with accent color pellets comprised of, acrylic resins blended with poly-.alpha.-methyl styrene (PMS) resin. The PMS resin in the pellets has a higher vicat softening point temperature and a higher melt flow index relative to the acrylic resins in the same pellets. Varying the proportion of the PMS to the acrylic resins in the pellets results in a corresponding, soft streaking (gradual color change) or hard streaking (abrupt color change) in the polymer matrix.

United States Published Patent Application No. 2005/0003221 A1, to Walrath, discloses an optically clear cap stock manufactured from a matrix resin of methacrylic acid polymer or other essentially clear, ultraviolet resistant, matrix materials, and streaker pellets of a polymeric material compatible with the methacrylic matrix resin but having a higher melting point. The matrix resin and streaker pellets are fed into an intake end of an extruder screw feed. The screw feed has four temperature stages, such that the transparent matrix material melts and flows before the streaker pellets become melted within the last temperature stage. Then, the melted materials are extruded to form a transparent cap stock having accent color streaks in a transparent matrix. Further, the cap stock is coextruded with an underlying polymeric substrate that is visible through the transparent cap stock. The cap stock has a heat deflection temperature and a glass transition temperature similar to that of the coextruded substrate.

U.S. Pat. No. 7,987,885 B2 to Zhou et al. discloses in FIG. 1 an extrusion line for making a reinforced structural plastic profile such as a decking board. This production system has filaments which are drawn into a die 18. A first extruder 24 injects a resin into the die to surround the filaments and form the substrate. A second extruder 35 supplies a second resin which forms the cap layer over the substrate. At column 4, line 64, through column 5, line 4, the patent teaches that a fourth resin could be applied in a subsequent coextrusion or extrusion coating step.

U.S. Pat. No. 8,955,281 B2 to Pietruczynik et al. discloses a building product that can be used for a decking board which has a hollow core over which a cap stock layer is applied. The patent teaches that additional layers can be coextruded to form a multilayer article. See column 12, lines 58-66. The patent also teaches that a variegated pattern may be created by using pellets of different viscosities.

It is quite common to emboss the surface of the decking board or other product containing the cap layer. To achieve a consistent embossing pattern on the entire embossed surface it is critical that the surface which is being embossed be smooth across the entire surface. Even small depressions or projections on the surface can change the appearance of the embossing pattern. Such depressions and projections can also cause uneven surface wear such that the appearance of the capped surface will change over time. For that reason the art has not applied streaks onto the top of the cap layer but always has created the streaks within the capping layer.

However, if streaks could be applied onto the cap layer without interfering with the embossing process or creating uneven wear in the finished product then one would have greater control of the width and locations of the streaks in the final product. This control would enable the manufacturer to make variegated products which all have the same pattern on the variegated surface.

SUMMARY OF THE INVENTION

I provide a system and method in which a cap layer is applied to a substrate and pin stripes are applied onto the cap layer when the substrate, cap layer material and pin stripe cap layer material pass through an extrusion die. After these materials exit the extrusion die they are passed through single opening in a die plate to create a capped structure having a variegated appearance. This capped structure has a smooth surface that enables an embosser to create a consistent embossing pattern on the entire surface.

I prefer that the same material be used for both the cap layer material and pin stripe cap layer material. This material can be high density polyethylene (HDPE) or polyvinyl chloride (PVC) or any other extrudable plastic. The primary cap layer material and the pin stripe cap layer material preferably have a melt temperature of from 290° F. to 500° F. (143° C. to 260° C.) so that when those materials pass through the cap layer die they will be within that temperature range. I prefer that the primary cap layer material pass through the cap layer die at a flow rate of from 75 lb./hr. to 150 lb./hr. and the pin stripe cap layer material pass through the cap layer die at a flow rate of from 3 lb./hr. to 5 lb./hr.

My system contains a first extruder configured to extrude a substrate, a second extruder for extruding a primary cap layer and a third extruder for extruding a pin stripe cap layer. There is a cap layer die having a first opening sized and configured to receive the substrate, a primary cap layer opening adjacent the first opening and several pin stripe openings adjacent the primary cap layer opening. The primary cap layer opening is sized and configured to apply a primary cap layer onto the substrate. The pin stripe openings are sized and positioned to apply pin stripe cap material onto the primary cap layer. The cap layer die is aligned with the first extruder and configured to receive the substrate. The primary cap layer opening is connected to the second extruder and the plurality of pin stripe openings are connected to the third extruder. There is a die plate connected to the cap layer die. The die plate has a single opening through which the substrate, primary cap layer and pin stripe layer pass after exiting the cap layer die, the substrate, primary cap layer and pin stripe layer forming a capped extruded structure.

Other objects and advantages of my system and method will become apparent from a description of certain preferred embodiments thereof that are shown in the drawings,

DESCRIPTION OF THE PREFERRED EMBODIMENTS

Figure 1:
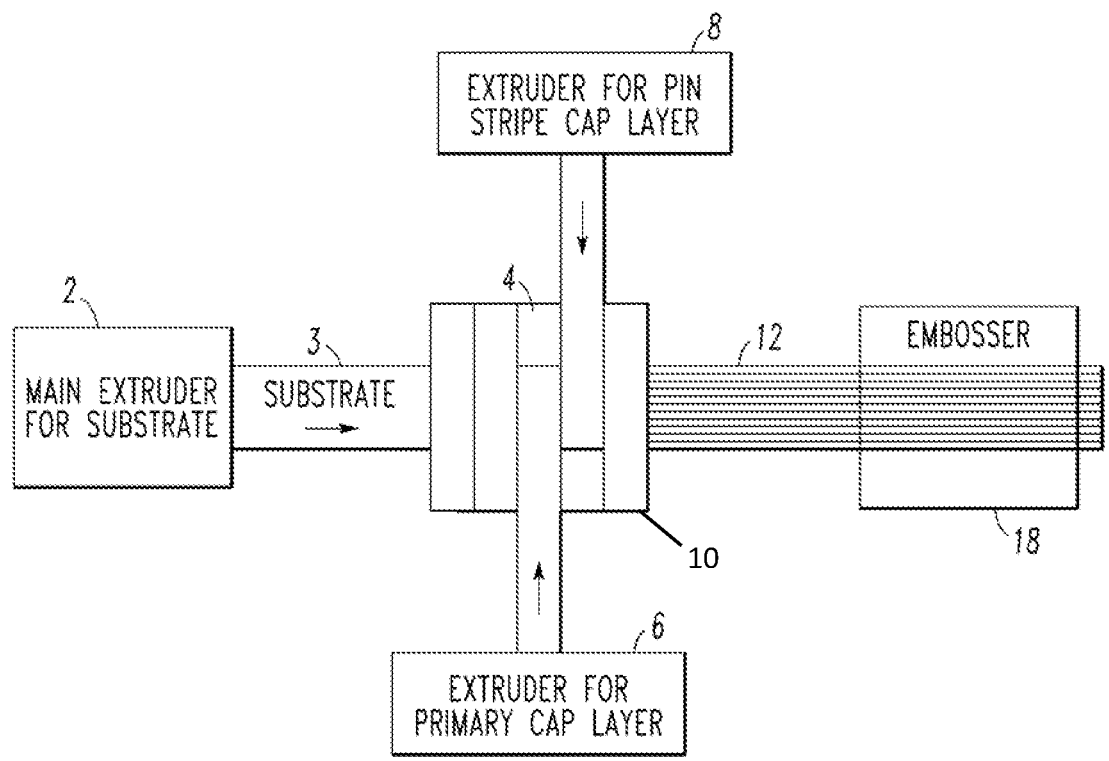
FIG. 1 is diagram of a present preferred embodiment of my system for making a capped extruded structure with variegated appearance.
Figure 2:
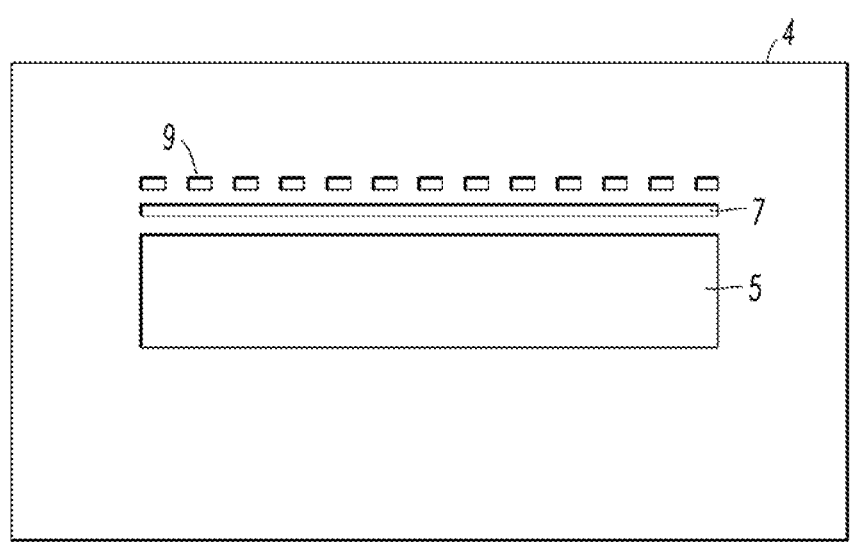
FIG. 2 is a front view of a present preferred embodiment of a cap layer extrusion die that can be used in the system shown in FIG. 1.
Figure 4:
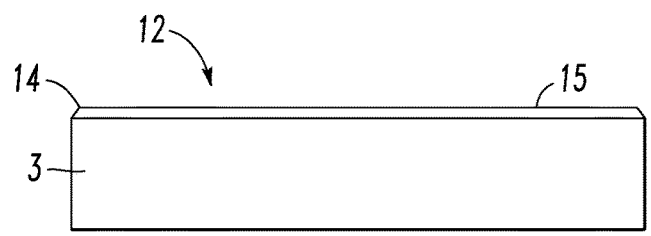
FIG. 4 is an end view of a capped structure made with the system of FIG. 1.

FIG. 1 is a diagram of a present preferred embodiment of my system for making a capped extruded structure with variegated appearance. This system has a main extruder 2 for extruding a substrate 3, such as a decking board. The extruded substrate 3 is directed through a cap layer die 4 in which a cap layer is applied to the top surface of the substrate. Wood plastic composite materials and foamed PVC materials are suitable substrates for a decking board. The cap layer die 4 has an opening 5 through which the substrate 3 passes. A cap layer extruder 6 is connected to the cap layer die 4. This extruder supplies primary cap layer material that is extruded thorough an opening 7 on the output side of the die. As can be seen in FIG. 2, this opening 7 is above the opening 5 through which the substrate 3 passes. Opening 7 has a width that is the same as the width of the substrate opening 5 so that the primary cap layer with cover the top of the substrate. The height of the opening can be 0.021 inches. There is also a pin stripe cap layer extruder 8 which is connected to the cap layer die 4. This extruder supplies stripe cap layer material to the cap layer die 4 which is extruded through openings 9 in the cap layer die. The openings may all have a same width or some of these openings may be wider than others of these openings but all of the openings 9 have the same height. Preferably that height is 0.004 inches. Immediately after the substrate, cap layer and pin stripe cap layer exit the cap layer die 4 they pass through a single opening 11 is die plate 10. The die plate causes the cap layer material and the pin stripe material to merge together to create a capped structure 12 such as is shown in FIG. 4. This capped structure is the substrate 3 having a cap layer 14 that contains the primary cap material and a series of parallel pin stripes made from the pin stripe material. When the opening 7 has a height of 0.021 inches and the openings 9 have a height of 0.004 inches the cap layer 14 will have a thickness of 0.025 inches. The surface 15 of this cap layer 14 is smooth across the entire top surface.

I prefer to use Cincinnati Milacron TP-140 extruder for the substrate extruder 2, a Cincinnati Milacron PAK300 extruder for the primary cap layer extruder 6 and a Cincinnati Milacron PAK200 extruder for the pin stripe cap layer extruder 8. These extruders have an internal heater and allow the operator to select the temperature at which the cap layer material is melted and the temperature at which the material leaves the extruder. In addition the flow rate of the material leaving the extruder can be precisely controlled. I prefer to use resins having a melt temperature of 290° F. to 500° F. (143° C. to 260° C.). This resin can be high density polyethylene (HDPE) or polyvinyl chloride (PVC). But the same material should be used for both the primary cap layer and the pin stripe layer. Suitable HDPE materials are available from Dow Chemical. Teknor Apex and PolyOne offer suitable PVC materials. I prefer that the primary cap layer material pass through the cap layer die at a flow rate of from 75 lb./hr. to 150 lb./hr. and the pin stripe cap layer material pass through the cap layer die at a flow rate of from 3 lb./hr. to 5 lb./hr.

As shown in FIG. 1 I prefer to provide an embosser 18 in line with the die plate. After the capped structure 12 passes through the die plate 10 the capped structure passes through the embosser 18. Because the cap layer has a smooth top surface 15. The pattern applied by the embosser will be consistent across that surface.

The finished product 12 shown in FIG. 1 has a series of continuous stripes in the cap layer. The width of the stripes and the boldness can be adjusted by changing the screw speed of the pin stripe layer extruder. One could create other stripe patterns by periodically stopping the flow of pin stripe cap material or by closing some of the openings 9 and 29. This can be done through the use of auto programed mechanical flow gates. The color of the pin stripes and the color of the primary cap material can be changed on the fly by using an additional extruder or changing the material supplied to the extruder.

Lower costs and greater consistency are other advantages of the present system and method. Streaker pellets can cost as much as $6.00 per pound and two of the same streaker pellets can produce different stripes of different length, width and color. The pin stripe cap materials cost about $1.00 per pound and the length, width and color of the stripes produced are consistent and controllable.

The capped structure shown in FIG. 4 has a cap layer on only one surface. However, my system and method can also be used to provide a cap layer on the opposite surface by providing a die 20 shown in FIG. 5 to create the capped structure shown in FIG. 6. This capped structure 30 consists of a substrate 33 having a top cap layer 34 and a bottom cap layer 36. Either or both of the top cap layer 34 and the bottom cap layer 36 may be variegated cap layers.

Figure 3:
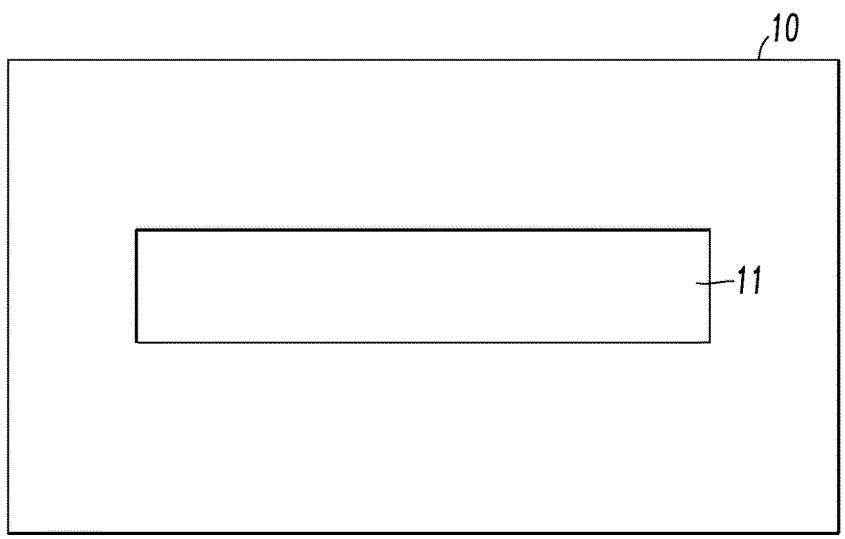
FIG. 3 is front view of a present preferred embodiment of a die plate that can be used in the system shown in FIG. 1.
Figure 5:
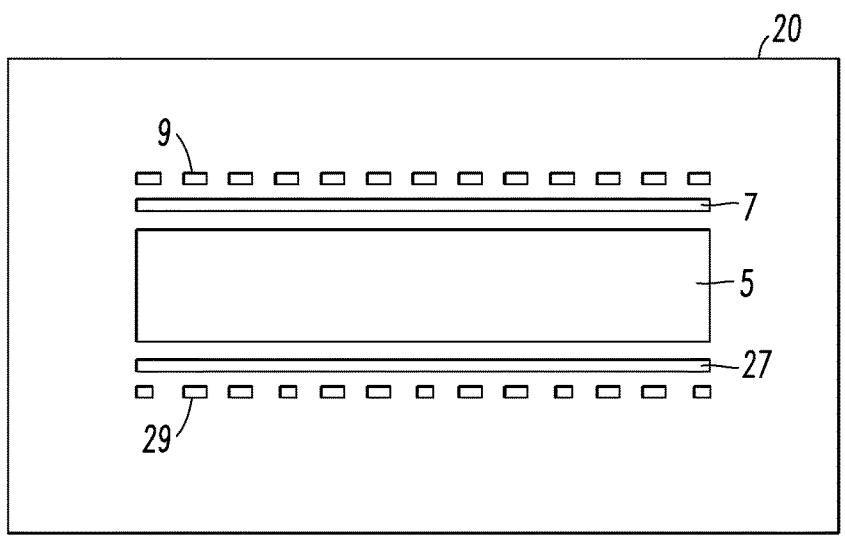
FIG. 5 is a front view of a second present preferred embodiment of a cap layer extrusion die that can be used in the system shown in FIG. 1.
Figure 6:
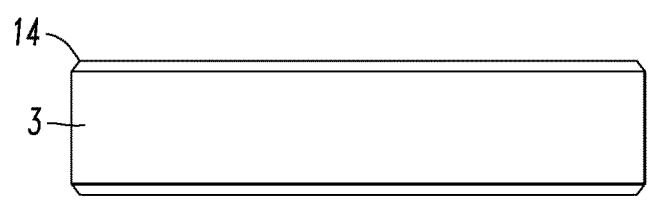
FIG. 6 is an end view of a capped structure made with the cap layer extrusion die shown in FIG. 5.

The die shown in FIG. 5 is configured to produce a variegated top cap layer and a variegated bottom cap layer. The die has opening 5 through which the substrate 33 passes. Above that opening is an opening 7 through which the primary cap layer material passes and a series of openings 9 through which the pin stripe cap material passes. Openings 7 and 9 are above the substrate opening 5. Below the substrate opening 5 there is an opening 27 through which the primary cap material passes. A series of openings 29 through which the pin stripe material passes are provided below opening 27. Openings 7 and 9 provide the material for the variegated cap layer 34 on top of the substrate. Openings 27 and 29 provide the material for a variegated cap layer 36 on the bottom of the substrate. The cap layer extruder 6 supplies primary cap layer material that is extruded through openings 7 and 27. The pin stripe cap layer extruder 8 supplies pin stripe cap layer material that is extruded through openings 9 and 29. One can provide a non-variegated cap layer on the bottom of the structure by eliminating openings 29 or not extruding pin stripe material through openings 29. As in the first embodiment the substrate with the cap layers applied then passes through a die plate having a single opening such as die plate 10 shown in FIG. 3.

Although I have shown and described certain present preferred embodiments of my system and method it should be distinctly understood that the invention is not limited thereto but may be variously embodied within the scope of the following claims.

The invention claimed is:

1. A system for making a capped extruded structure with variegated appearance comprising:
   a first extruder configured to extrude a substrate;
   a second extruder for extruding a primary cap layer;
   a third extruder for extruding a pin stripe cap layer;
   a cap layer die having a face, a first opening sized and configured to receive the substrate, the first opening passing through the face, a primary cap layer opening adjacent the first opening and passing through the face, the primary cap layer opening sized and configured to apply a primary cap layer onto the substrate, and a plurality of pin stripe openings adjacent the primary cap layer opening, the plurality of pin stripe openings passing through the face, the plurality of pin stripe openings sized and positioned to apply pin stripe cap material onto the primary cap layer, the cap layer die aligned with the first extruder and configured to receive the substrate, the primary cap layer opening connected to the second extruder and the plurality of pin stripe openings connected to the third extruder; and
   a die plate connected to the cap layer die and adjacent to the face of the cap layer die, the die plate having a single opening aligned with the first opening, primary cap layer opening and pin stripe openings in the cap layer die such that the substrate, primary cap layer and pin stripe layer must pass through the single opening after exiting the cap layer die, the substrate, primary cap layer and pin stripe layer to form a capped extruded structure having a cap layer with stripes in the cap layer.

2. The system of claim 1 also comprising an embosser positioned to receive and emboss at least one surface of the capped extruded structure.

3. The system of claim 1 wherein the plurality of pin stripe openings are rectangular having a height and a width and the pin stripe openings all have a same height.

4. The system of claim 3 wherein at least two of the plurality of pin stripe openings have different widths.

5. The system of claim 3 wherein all of the plurality of pin stripe openings have a same width.

6. The system of claim 1 wherein the second extruder is able to heat material for the primary cap layer to a temperature of from 290° F. to 500° F.

7. The system of claim 1 wherein the third extruder is able to heat material for the pin stripe cap layer to a temperature of from 290° F. to 500° F.

8. The system of claim 1 wherein the second extruder is capable of creating a flow rate of material passing out of the second extruder of from 75 lb./hr. to 150 lb./hr.

9. The system of claim 1 wherein the primary cap layer and the pin stripe layer are comprised of a same material.

10. The system of claim 9 wherein the same material is high density polyethylene or polyvinyl chloride.

11. The system on claim 1 wherein the substrate is a decking board.

12. The system of claim 1 wherein the capped extruded structure is one of a panel, a decking board and a siding board.

13. A method for making a capped extruded structure with variegated appearance comprising:
   extruding a polymeric material to form a substrate,
   simultaneously passing the substrate, a primary cap layer material and a pin stripe cap layer material through a cap layer die having:
      a face,
      a first opening sized and configured to receive the substrate, the first opening passing through the face,
      a primary cap layer opening adjacent the first opening and passing through the face, the primary cap layer opening sized and configured to receive and receiving the primary cap layer material and applying that material as a primary cap layer onto the substrate, and
      a plurality of pin stripe openings adjacent the primary cap layer opening, the plurality of pin stripe openings passing through the face, the plurality of pin stripe openings sized and configured to receive and receiving the pin stripe cap layer material and applying the pin stripe cap layer material onto the primary cap layer;
   thereby forming an extruded structure in which the pin stripe cap layer material is in on the cap layer material and the cap layer material is on the substrate; and
      passing the extruded structure containing the substrate, the primary cap layer material and the pin stripe cap layer material through a single opening in a die plate, the die plate connected to the cap layer die and adjacent to the face of the cap layer die, such that the single opening in the die plate is aligned with the first opening, primary cap layer opening and pin stripe openings in the cap layer die and, a capped extruded structure having a cap layer with stripes in the cap layer is formed.

14. The method of claim 13 wherein the primary cap layer material and the pin stripe cap layer material are at a temperature of from 290° F. to 500° F. when those materials pass through the cap layer die.

15. The method of claim 13 wherein the primary cap layer material passes through the cap layer die at a flow rate of from 75 lb./hr. to 150 lb./hr.

16. The method of claim 13 wherein the pin stripe cap layer material passes through the cap layer die at a flow rate of from 3 lb./hr. to 5 lb./hr.

17. The method of claim 13 wherein the primary cap layer material and the pin stripe cap layer material are comprised of a same material.

18. The method of claim 17 wherein the same material is high density polyethylene or polyvinyl chloride.

19. The system on claim 13 wherein the substrate is a decking board.

20. The system of claim 13 wherein the capped extruded structure is one of a panel, a decking board and a siding board.

\* \* \* \* \*